United States Patent
Schleicher et al.

(10) Patent No.: US 10,299,422 B2
(45) Date of Patent: May 28, 2019

(54) VEHICLE GUIDANCE FOR OFFSET APPLICATION OF CROP INPUTS

(71) Applicant: Deere & Company, Moline, IL (US)

(72) Inventors: Tyler D. Schleicher, Ankeny, IA (US); Noah J. Rasmussen, Cambridge, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/589,396

(22) Filed: May 8, 2017

(65) Prior Publication Data
US 2018/0317372 A1    Nov. 8, 2018

(51) Int. Cl.
| | |
|---|---|
| A01B 69/00 | (2006.01) |
| A01C 23/04 | (2006.01) |
| A01M 7/00 | (2006.01) |
| A01M 17/00 | (2006.01) |
| A01M 21/04 | (2006.01) |
| A01B 79/00 | (2006.01) |

(52) U.S. Cl.
CPC .......... *A01B 69/004* (2013.01); *A01B 79/005* (2013.01); *A01C 23/047* (2013.01); *A01M 7/0042* (2013.01); *A01M 7/0089* (2013.01); *A01M 17/00* (2013.01); *A01M 21/043* (2013.01); *A01M 7/0057* (2013.01)

(58) Field of Classification Search
CPC . A01B 69/004; A01M 7/0089; A01M 21/043; A01M 7/0042; A01M 17/00; A01C 23/047
See application file for complete search history.

(56) References Cited

U.S. PATENT DOCUMENTS

| | | | |
|---|---|---|---|
| 4,967,362 A | 10/1990 | Schutten et al. | |
| 5,442,552 A * | 8/1995 | Slaughter | G05D 1/0246 |
| | | | 701/28 |
| 5,516,044 A | 5/1996 | Thorstensson | |

(Continued)

FOREIGN PATENT DOCUMENTS

WO    2015154027 A1    10/2015

OTHER PUBLICATIONS

Boyd, P. M., et al. "Field corn tests to examine anhydrous ammonia manifold variability." Agronomy Conference Proceedings and Presentations, 2002 [online] [retrieved on Sep. 23, 2017]. Retrieved from <http://lib.dr.iastate.edu/cgi/viewcontent.cgi?article=1033&context=agron_conf>.

(Continued)

*Primary Examiner* — Rodney A Butler

(57) ABSTRACT

A data processor can estimate a series of center points between the first row and the second row based on targeting substantial symmetry in the first sensor signal response and the second sensor signal response. A nozzle is associated with the sprayer implement. The nozzle has a nozzle position with respect to a corresponding center point between the rows of plants. An offset module is adapted to shift laterally the nozzle position from or with respect to each center point to a corresponding offset lateral position such that a spray pattern of the nozzle is directed toward target strip of soil or ground around or containing a plant stem, or root zone, of the plants in the row.

16 Claims, 9 Drawing Sheets

(56) References Cited

U.S. PATENT DOCUMENTS

| | | | | |
|---|---|---|---|---|
| 5,837,997 | A | * | 11/1998 | Beck .................... G01J 1/04 |
| | | | | 250/227.11 |
| 5,842,307 | A | | 12/1998 | May |
| 6,021,959 | A | * | 2/2000 | Mayfield, Jr. ....... A01M 7/0014 |
| | | | | 239/67 |
| 6,079,192 | A | | 6/2000 | Rasmussen |
| 6,176,779 | B1 | | 1/2001 | Riesterer et al. |
| 7,716,905 | B2 | | 5/2010 | Wilcox et al. |
| 8,924,092 | B2 | | 12/2014 | Achen et al. |
| 9,148,995 | B2 | | 10/2015 | Hrnicek et al. |
| 9,485,914 | B2 | | 11/2016 | Schleicher et al. |
| 2004/0060272 | A1 | | 4/2004 | De Mendonca Fava et al. |
| 2005/0095108 | A1 | | 5/2005 | Hinds |
| 2005/0197766 | A1 | | 9/2005 | Flann et al. |
| 2010/0017075 | A1 | | 1/2010 | Beaujot |
| 2013/0043326 | A1 | | 2/2013 | Muff |
| 2014/0074360 | A1 | | 3/2014 | Rosa et al. |
| 2015/0245565 | A1 | * | 9/2015 | Pilgrim .................. A01G 7/06 |
| | | | | 280/79.2 |
| 2015/0334920 | A1 | | 11/2015 | Schleicher et al. |
| 2016/0175869 | A1 | * | 6/2016 | Sullivan ................ B05B 12/008 |
| | | | | 239/11 |
| 2016/0316736 | A1 | * | 11/2016 | Desai .................. A01M 7/0075 |
| 2017/0325444 | A1 | * | 11/2017 | Crinklaw ............ A01M 7/0089 |

OTHER PUBLICATIONS

"Circular Buffer." Wikipedia [online article] [retrieved on Jul. 23, 2013]. Retrieved from <http://en.wikipedia.org/wiki/Circular_buffer>.
Search Report issued in counterpart application No. EP18169488.6, dated Oct. 8, 2018 (9 pages).

* cited by examiner

US 10,299,422 B2

VEHICLE GUIDANCE FOR OFFSET APPLICATION OF CROP INPUTS

FIELD

This disclosure relates to a vehicle guidance system and method for offset application of crop inputs.

BACKGROUND

In the prior art, crop row feelers can be used to guide an agricultural vehicle, implement or sprayer down a center line between two rows during application of crop inputs. However, only a portion of the crop inputs, such as nutrients or fertilizer, may reach the plants in the rows because the placement of the crop inputs is not sufficiently precise. Some of the crop inputs run-off before they are absorbed by the plant roots, other crop inputs remain too far away from the plant roots to be used effectively by the plants in the rows, and sometimes may even contribute to weed pressure on the crops. Accordingly, there is need for a vehicle guidance system and method for offset application of crop inputs to precisely deliver crop inputs proximate to the plant foliage or roots.

SUMMARY

In accordance with one embodiment, a system for guiding a vehicle comprises a first arm for pivoting about a first pivot point associated with a sprayer implement in response to contact with a first row of plants. A first sensor is associated with the first arm to provide a first sensor signal response indicative of a first position or first movement of the first arm with respect to the first row. A second arm can pivot about a second pivot point associated with the sprayer implement, in response to contact with the first row, or second row of plants spaced apart from the first row with a substantially parallel spacing. A second sensor is associated with the second arm to provide a second sensor signal response indicative of a second position or second movement of the second arm with respect to the first row, or second row. A electronic data processor can estimate a series of center points between the first row and the-second row based on targeting substantial symmetry in the first sensor signal response and the second sensor signal response as an indication that a longitudinal axis of the vehicle is aligned with the center point (e.g., or the series of center points during successive sampling periods), where substantial symmetry is present if an error or difference between the first sensor signal response and the second sensor signal response is less than a threshold for each estimated center point in the series of center points. A nozzle is associated with the sprayer implement. The nozzle has a nozzle position with respect to a corresponding center point between the rows of plants. An offset module is adapted to shift laterally the nozzle position from or with respect to each center point to a corresponding offset lateral position such that a spray pattern of the nozzle is directed toward target strip of soil or ground around or containing a plant stem, plant foliage, or root zone, of the plants in the row.

BRIEF DESCRIPTION OF THE DRAWINGS

Like reference numbers in any set of drawings in this document indicate like elements, features or steps.

DETAILED DESCRIPTION

Figure 1A:
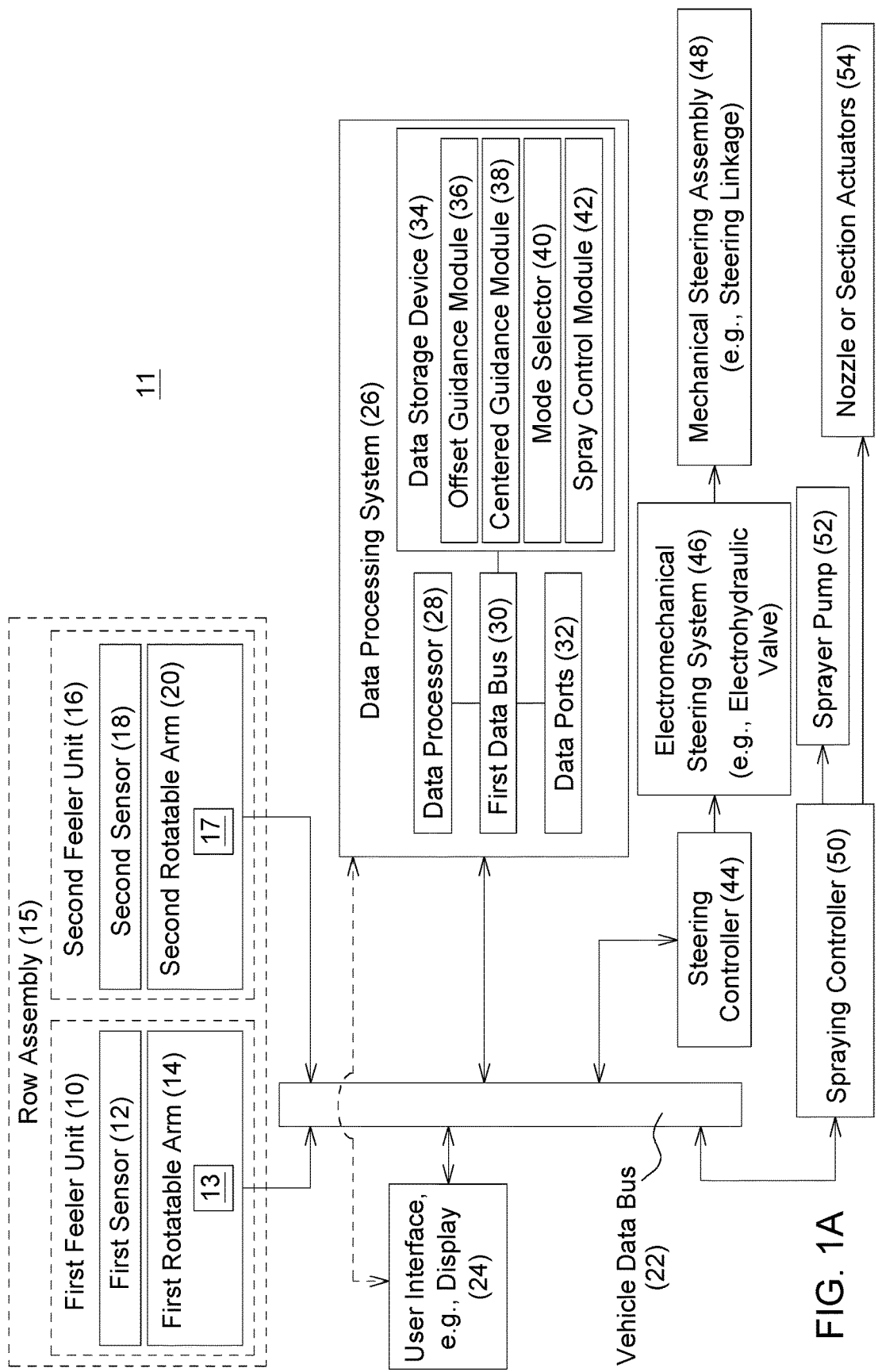
FIG. 1A is a block diagram of one embodiment of a system for guiding a vehicle with row feelers or tactile sensors for lateral offset application of crop inputs.

In accordance with one embodiment, FIG. 1A illustrates a system 11 for guiding a vehicle that comprises a first rotatable arm 14 and a second rotatable arm 20 of a row assembly 15. The first rotatable arm 14 can pivot about a first pivot point (e.q., 23) associated with a sprayer implement (e.g., a sprayer boom with nozzles and tubes that is towed on a trailer or attached to the vehicle) in response to contact with a first row of plants. A first sensor 12 is associated with the first rotatable arm 14 to provide a first sensor 12 signal response indicative of a first position or first movement of the first rotatable arm 14 with respect to the first row. A second rotatable arm 20 can pivot about a second pivot point (e.g., 25) associated with a sprayer implement, in response to contact with the first row, or second row of plants spaced apart from the first row with a substantially parallel spacing. For example, the substantially parallel spacing between adjacent plant rows may represent a known spacing or known lateral separation distance based on the configuration of seeding or planting equipment; the row or plant positions can be recorded in a data file of map of rows versus location coordinates, by an optional location-determining receiver on seeding or planting equipment, that are inputted to the data processing system 26 via user interface 24 or wireless communications device in communication with the vehicle data bus 22. A second sensor 18 is associated with the second rotatable arm 20 to provide a second sensor 18 signal response indicative of a second position or second movement of the second rotatable arm 20 with respect to the first row, or second row. A data processor 28 can estimate a series of center points between the first row and the-second row based on targeting substantial symmetry in the first sensor 12 signal response and the second sensor signal response as an indication that a longitudinal axis of the vehicle is aligned with each center point in the series of center points, where substantial symmetry is present if an error or difference between the first sensor 12 signal response and the second sensor signal response is less than a threshold for each estimated center point in the series of center points. For example, the estimated series of center points are substantially equidistant to the adjacent plant rows, the plant stems of plants in adjacent rows, or the volumetric center of the foliage of plants in adjacent rows from a plan or top view perspective.

A nozzle (73, 75 in FIG. 4) is associated with the sprayer implement or boom 55. The nozzle (73, 75) has a nozzle position with respect to a corresponding center point between the adjacent rows of plants. An offset guidance module 36 is adapted to shift laterally the nozzle position from or with respect to each center point to a corresponding offset lateral position such that a spray pattern of the nozzle is directed toward target strip of soil or ground around or containing a plant stem, plant foliage, or root zone, of the plants in the row. Accordingly, where the two nozzles are available per row, the spraying controller 50, the spray control module 42 or both may provide control data message to the nozzle actuators 54 (e.g., electrically controlled valve) to activate one of the two nozzles for each nozzle assembly 66. In a first example, if the vehicle has a lateral offset toward the right in FIG. 4 where the vehicle is facing frontward (e.g., where lateral distance D2 is less than lateral distance D1 in FIG. 4) the spraying controller 50, the spray control module 42, or both may provide control data message to the nozzle actuators 54 (e.g., electrically controlled valve) to deactivate each first nozzle 73 (e.g., left hand nozzle) and to actuate each second nozzle 75 (e.g., right hand nozzle) for all of the nozzle assemblies 66. In a second example, if the vehicle has a lateral offset closer to the left in FIG. 4 where the vehicle is facing frontward (e.g., where lateral distance D1 is less than lateral distance D2 in FIG. 4), the spraying controller 50, the spray control module 42 or both may provide control data message to the nozzle actuators 54 (e.g., electrically controlled valve) to activate each first nozzle 73 (e.g., left hand nozzle) and to deactivate each second nozzle 75 (e.g., right hand nozzle) for all of the nozzle assemblies 66. In a third example, when traversing the row with a lateral offset, the first nozzle 73 is selected to have a different spray distribution pattern (e.g., aiming the primary direction of the spray distribution pattern by selecting different mounting angles and/or heights of the nozzles) of crop input (e.g., spray or chemicals) than the second nozzle 75, such that both the first nozzle 73 and the second nozzle 75 are both actuated simultaneously to deliver generally symmetrical distribution patterns to a target strip of soil, ground or foliage associated with adjacent rows.

In one embodiment as illustrated in FIG. 1A, a row assembly 15 comprises a first feeler unit 10 and a second feeler unit 16. A first feeler unit 10 comprises a first rotatable arm 14 and a corresponding first sensor 12, where each first rotatable arm 14 has an embedded first magnet 13 and where the first sensor 12 comprises a magnetic field sensor (e.g., Hall effect sensor) for measuring the field strength or proximity of the first magnet 13 as the first rotatable arm 14 contacts (or is deflected from) one or more plants of rows. The first feeler unit 10 or first rotatable arm 14 is supported by a vertical support (64 or 94) extending downward from the boom 55 of the sprayer implement. In one embodiment, the vertical support (64 or 94) comprises a hollow tube or conduit for conveying the crop input or fluid spray, while providing structural support to support or suspend a row unit (15, 115), a nozzle assembly 66, or both.

In FIG. 1A a second feeler unit 16 comprises a second rotatable arm 20 and a corresponding second sensor 18, where each second rotatable arm 20 has an embedded second magnet 17 and where the second sensor 18 comprises a magnetic field sensor (e.g., Hall effect sensor) for measuring the field strength or proximity of the second magnet 17 as the second rotatable arm 20 contacts (or is deflected from) one or more plants of rows. The second row feeler unit or second rotatable arm 20 is supported by a vertical support extending downward from the boom of the sprayer implement.

In one embodiment, the first sensor 12 and the second sensor 18 each include an analog-to-digital converter to convert analog sensor signals to digital sensor signals. Further, the first sensor 12 and the second sensor 18 each has a communications module (e.g., transceiver) for communicating over a vehicle data bus 22 or an implement data bus to the data processing system 26 or other network controllers. For instance, the first sensor 12 and the second sensor 18 provide first signals and second signals to a vehicle data bus 22 or implement data bus, or directly to input ports of a data processing system 26.

The data processing system 26, the steering controller 44, and spraying controller 50 can communicate with each other via the vehicle data bus 22 or implement data bus. Further, in one embodiment, the user interface 24 (e.g., display) and the data processing system 26 can communicate with each other via the vehicle data bus 22 and the implement data bus. However, in alternate embodiments, the user interface 24 directly communicates with the data processing system 26 via a data port 32 of the data processing system 26.

In one embodiment, the data processing system 26 comprises a data processor 28, a data storage device 34 and one or more data ports 32 coupled to the first data bus 30. The data processor 28 may comprise a microprocessor, a microcontroller, a programmable logic array, digital signal processor, an application specific integrated circuit, a logic circuit, an arithmetic logic unit, or another electronic data processing unit.

The user interface 24 may comprise a display, a touch screen display, keyboard, keypad, pointing device (e.g., electronic mouse), removable storage medium port for file transfer or other user interface for inputting data, outputting data or interacting with the data processing system 26.

The data storage device 34 comprises electronic memory, nonvolatile random access memory, an optical storage device, a magnetic storage device, a magnetic hard drive, a magnetic tape, or another device for storing digital data.

In one embodiment, the data storage device 34 stores one or more of the following modules, such as software modules: offset guidance module 36, a centered guidance module 38, mode selector 40 (e.g., mode selection module), and a sprayer control module 42.

The offset guidance module 36 comprises logic, software or a set of instructions for guiding the steering controller 44 of the vehicle (and its boom 55 and associated nozzles (73, 75)) to have a lateral offset with respect to a center line between plant rows in an offset guidance mode. The centered guidance module 38 comprises logic, software or a set of instructions for guiding the steering controller 44 to follow or track the center line between plant rows without any lateral offset in a centered guidance mode. The offset guidance mode is generally mutually exclusive to the centered guidance mode, and vice versa. However, the offset guidance module 36 and the centered guidance module 38 can operate simultaneously to provide seamless transitions between the centered guidance mode and the offset guidance mode (e.g., without any discontinuity or error in position). For instance, during the offset guidance mode, the centered guidance module 38 can estimate or predict the center points between the adjacent rows.

In one embodiment, the offset guidance module 36 further comprises a tracking module for determining a difference between the offset point and an observed offset point to generate a steering command by the steering controller 44 to reduce or drive the difference to substantially zero. Further, the offset guidance module 36 may comprise a tracking module and an offset point limit module for limiting an adjustment to the offset point to a maximum deviation or maximum limit per unit time. In one embodiment, the offset guidance module 36 or offset limit module may determine a lateral offset limit or limit to the offset point based on the row spacing between adjacent rows of the crop, the tire width of the tires on the sprayer vehicle, the lateral wheelbase of the sprayer vehicle, the crop type, and the crop maturity to avoid damaging or running over row of crop. For example, an operator may input the row spacing, the tire width, lateral wheelbase, the crop type and planting date into the user interface 24, such that the data processor 28 or offset point limit module (within the offset guidance module 36) can estimate the offset limit from a centered path of the vehicle that will not damage or crush a material portion of the crop or cultivated plants (as opposed to weeds between the rows).

In an alternate embodiment, the adjacent rows may wider-spaced (e.g., than conventional or the row spacing currently in vogue) or skip-row planted for corn or maize, or configured as sets of rows adjacent rows in beds for certain vegetable or fruit crops in accordance with standard agronomic practices or crop insurance requirements, such that the offset guidance module 36 can adjust or increase the lateral offset limit or limit to the offset point. Although rows may be wider-spaced for row crops as indicated above, the seed density may be increased in each row to offset the wide row spacing, such that the offset guidance module 36 can facilitate intensive, directed, or targeted lateral offset application fertilizer or crop inputs for farming practices of wide row spacing.

The mode selector 40 comprises logic, software or a set of instructions for selecting an offset guidance mode or a centered guidance mode. For example, the mode selector 40 may select the offset guidance module 36 to control the steering controller 44 during an offset guidance module, whereas the mode selector 40 may select the centered guidance module 38 to control the steering controller 44 during a centered guidance mode.

In one embodiment, a vertical support 64 feeds the nozzle (73, 75, 77), the vertical support 64 extending vertically downward from the sprayer implement or boom 55, the vertical support 64 terminating in the nozzle (73, 75, 77), the nozzle having a set of one or more openings for directing fertilizer in a directional spray pattern. For example, the directional spray pattern is a substantially linear segment or substantially rectangular, where its longitudinal axis is aligned with or substantially parallel to the first row or the second row.

In one embodiment, a mode selector 40 is adapted to select a centered guidance mode (e.g., center-aligned path mode) or an offset guidance mode (e.g., offset path mode) for the sprayer implement or the nozzle (73, 75, 77) with respect to the plants in the row, where the mode selector 40 selecting the offset path mode in response to a user input into a user interface 24 (e.g., touch screen display).

In another embodiment, a mode selector 40 is adapted to select a centered guidance mode with a center-aligned path of the implement or nozzle if the sprayer implement is arranged or ready to spray pesticide, insecticide, or fungicide. Similarly, in one configuration, a mode selector 40 is adapted to select a centered guidance mode with a center-aligned path of the nozzle (73, 75, 77) or the sprayer implement if the nozzle or active nozzle (e.g. activated by the nozzle or section actuators 54) has a substantially conical spray pattern, a fan spray pattern or a substantially linear spray pattern.

In one embodiment, a mode selector 40 is adapted to an offset-aligned path mode of the nozzle or the sprayer implement if the nozzle comprises a fertilizer nozzle with one to three spray openings for the fertilizer to be dispensed.

In one embodiment, the data processor 28, the spray control module 42, or the spraying controller 50 determines one or more of the following: (1) whether or not to activate different nozzles (73, 75, 77), or sets of nozzles of the sprayer, (2) when to activate different nozzles (73, 75, 75), or sets of nozzles of the sprayer based on the corresponding location data for the sprayer implement, the nozzles and a spray plan or prescription; and (3) the application rate, concentration, pressure, nozzle selection, or other control of the nozzles of the sprayer based on the corresponding location data for the sprayer implement, the nozzles a spray plan or prescription.

In one embodiment, the steering controller 44 is coupled to the electromechanical steering system 46. In turn, the electromechanical steering system 46 is coupled to a mechanical steering assembly 48. In one embodiment, the electromechanical steering system 46 comprises an electro-hydraulic valve. In an alternate embodiment, the electromechanical steering system 46 may comprise an electrical motor that drives a rack-and-pinion gear for steering the vehicle. In another alternate embodiment, the steering controller 44 may control a differential steering system 46 that applies differential torque commands to drive wheels on the implement, sprayer or vehicle, such as to electric drive motors that drive different wheels.

The mechanical steering assembly 48 comprises a steering linkage, such as a rack-and-pinion gear or another linkage for transmitting rotational energy from the electromechanical steering system 46 to the yaw or heading of wheels of the vehicle.

In one embodiment, a spraying controller 50 is coupled to a sprayer pump 52 for distribution of crop inputs to the plants via nozzles (73, 75, 77), nozzle actuators or section actuators 54. Nozzles (73, 75, 77) may be actuated, deactivated, controlled, or operated by actuators 54, such as electromechanical valves, solenoid-controlled valves or other valve actuators. For example, actuators 54 (e.g., section actuators 54) are electromechanical valves, solenoid-controlled valves or other valve actuators that control a set or group of valves.

Figure 1B:
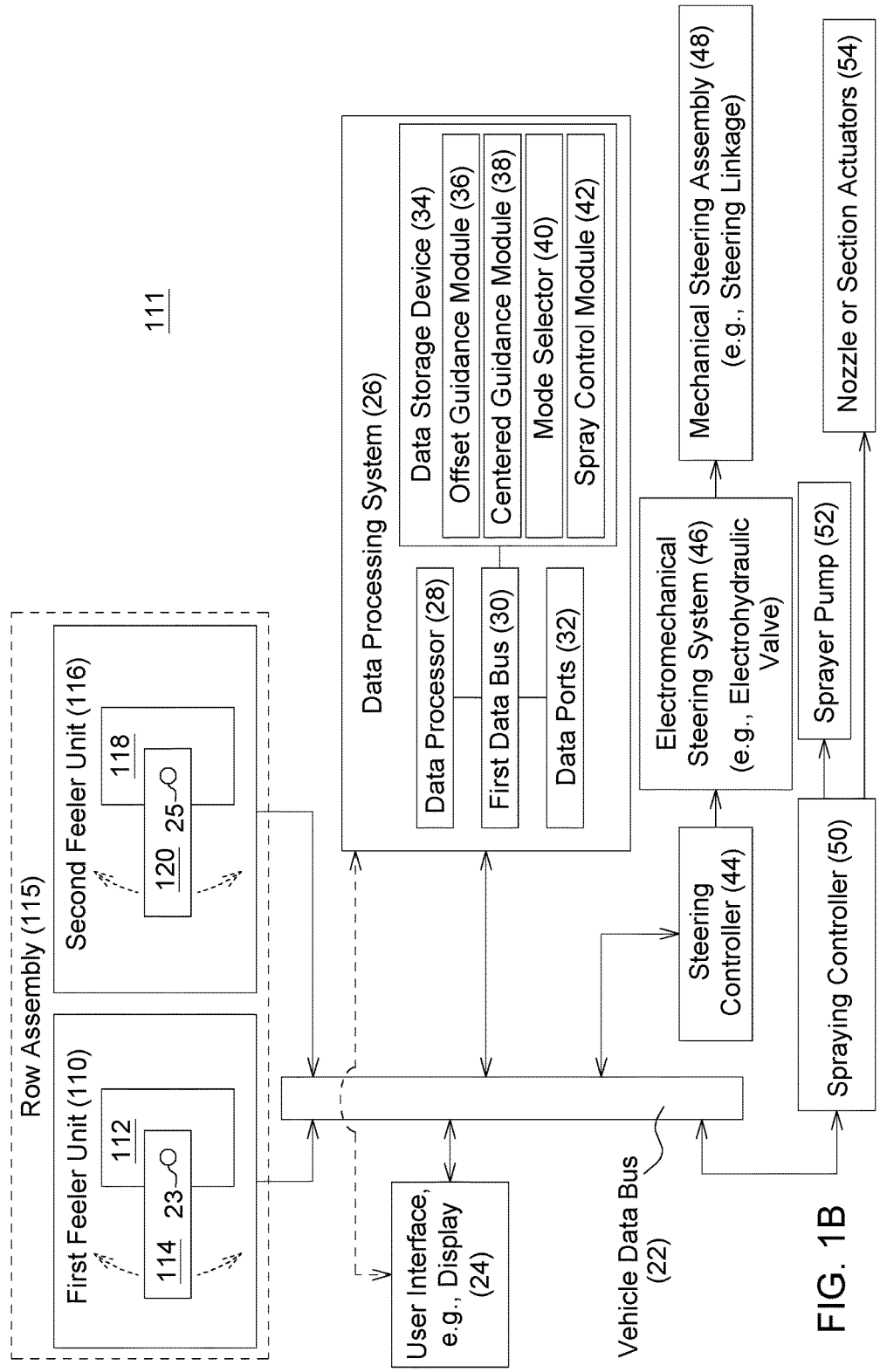
FIG. 1B is a block diagram of another embodiment of a system for guiding a vehicle with row feelers or tactile sensors for lateral offset application of crop inputs.

The system 111 of FIG. 1B is similar to the system 11 of FIG. 1A, except the system 111 of FIG. 1B replaces row assembly 15 with row assembly 115, which features a first feeler unit 110 and a second feeler unit 116. In particular, row assembly 115 deletes the first magnet 13 and second magnet 17 embedded in or attached to the first rotatable arm 14 and the second rotatable arm 20, respectively. Further, the first sensor 12 and the second sensor 18 of system 11 are replaced by first sensor 112 (e.g., first angle sensor) and second sensor 118 (e.g., second angle sensor) of system 111. The first sensor 112 and the second sensor 118 each comprises a resistive angle sensor (e.g., potentiometer) or another electrical angle sensor that (e.g., by changes in observed electrical parameters versus angle of rotation) can detect an angle of rotation between each rotatable arm (114, 120) and a corresponding mounting assembly with a pivot point. Like reference numbers in FIG. 1A and FIG. 1B indicate like elements or features.

Figure 2:
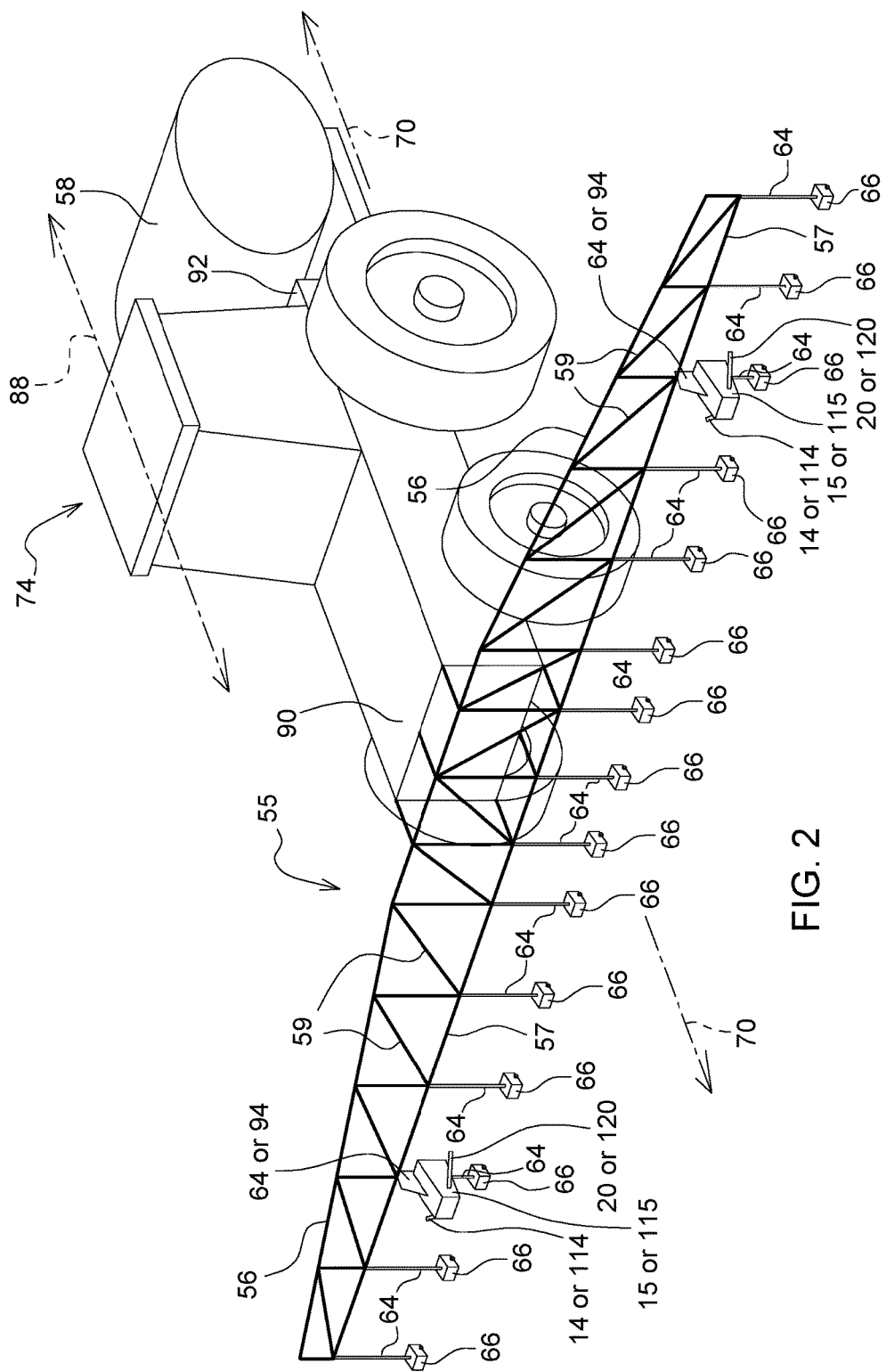
FIG. 2 illustrates a perspective view of a sprayer having a front-mounted boom that incorporates row feelers for guidance.

FIG. 2 illustrates a perspective view of a sprayer or sprayer vehicle 74 with a front-mounted boom 55. The sprayer vehicle 74 has a boom 55 that incorporates row assemblies (15 or 115) with respective row feelers or tactile sensors for guidance of the vehicle 74 between the rows. The boom 55 is mounted to a front 90 of the sprayer vehicle 74. The crop inputs to be sprayed can be held in tank 58 positioned at or near a rear 92 of the sprayer vehicle 74, which is opposite from the front 90.

Each row assembly (15 or 115) comprises a first feeler unit (10 or 110) and a second feeler unit (16 or 116) that is supported by a vertical support (64 or 94) extending downward from the boom 55 of the sprayer implement. As shown, a first row assembly (15 or 115) and a second row assembly (15 or 115) are each supported or suspended by a vertical support (64 or 94) extending downward from the boom 55 of the sprayer implement. Each row assembly (15, 115) houses the first sensor (12, 112) and the second sensor (18, 118) in a common housing. T The data processing system 26 can be housed in the cab of the vehicle 74, in the engine compartment, or elsewhere. The vehicle data bus 22 or implement data bus may comprise a twisted wire pairs, coaxial cable, or other transmission line that runs between each row unit (15, 115) and the data processing system 26. The data processing system 27 can receive and process sensor signals or sensor data from one or more row assemblies (15, or 115). For example, the offset guidance module 36, the centered guidance module 38, that data processor 28, or any combination of the foregoing can average, combine or statistically process sensor signals or sensor data from multiple row assemblies simultaneously during the same sampling interval as the vehicle traverses the field or work area. In particular, the offset guidance module 36, the centered guidance module 38, or both may determine a mean, mode, median or weighted average of the sensor signals or sensor data from multiple row assemblies.

In an alternate embodiment, via the user interface 24 the user may change any weighting of the sensor signals or sensor data from multiple row assemblies, where a row has missing plants or gaps, or where the row was formed as a guess row between adjacent passes of a planter or seeder that planted the rows.

Figure 3:
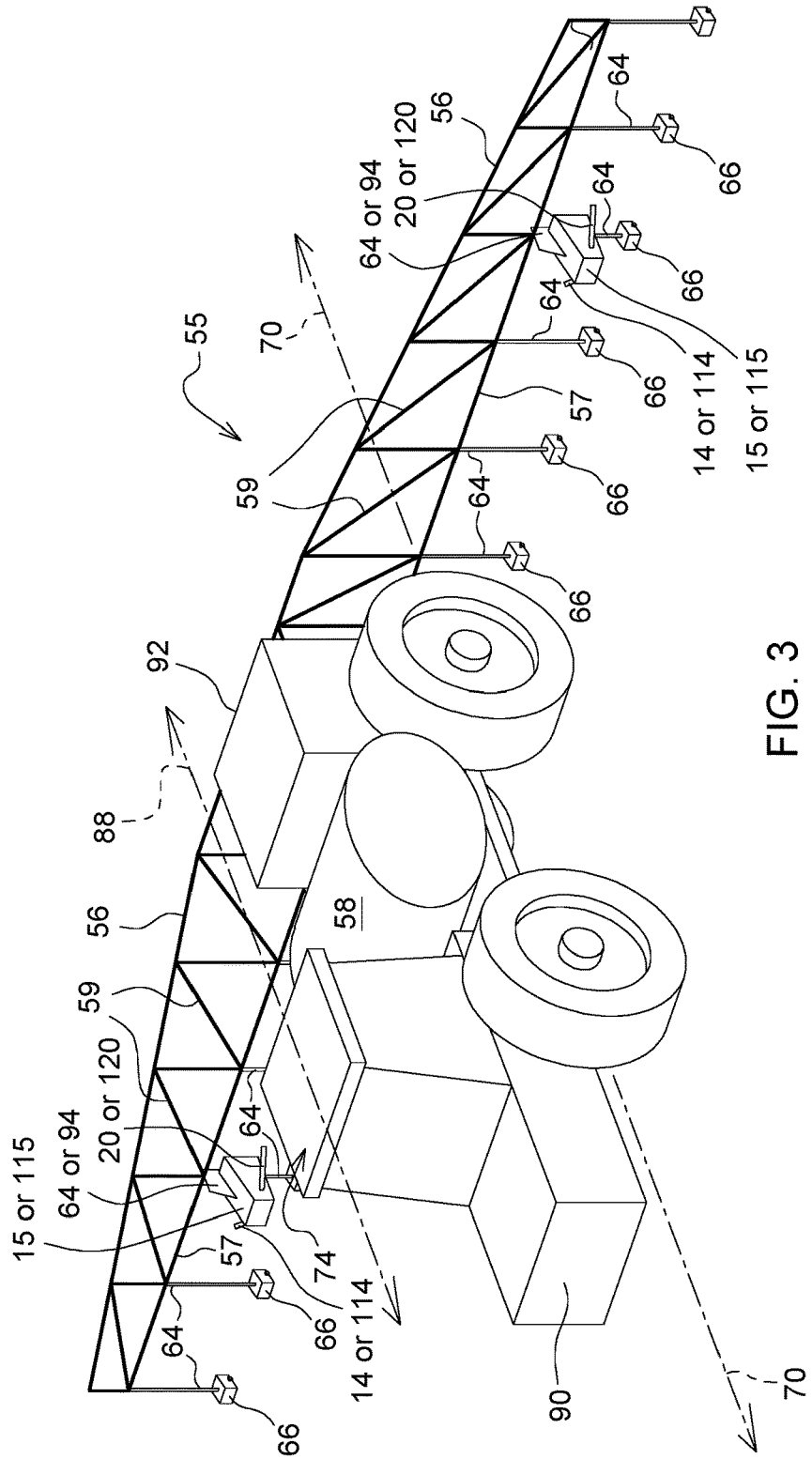
FIG. 3 illustrates a perspective view of a sprayer having a rear-mounted boom that incorporates row feelers for guidance.

FIG. 3 illustrates a perspective view of a sprayer having a rear-mounted boom 55 that incorporates row feelers for guidance. Like reference numbers in FIG. 2 and FIG. 3 indicate like elements or features.

The first row assembly (15, 115) is supported by a vertical support (64 or 94) extending downward from the boom of the sprayer implement. Similarly, a second row assembly (15 or 115) is supported by a vertical support (64 or 94) extending downward from the boom of the sprayer implement. The first row assembly (15, 115) houses the first sensor (12, 112) in a first housing and the second row assembly (15, 115) houses the second sensor (18, 118) in a second housing.

The data processing system 26 can be housed in the cab of the vehicle, in the engine compartment, or elsewhere. The vehicle data bus 22 or implement data bus may comprise a twisted wire pairs, coaxial cable, or other transmission line that runs between each row unit (15, 115) and data processing system 26.

The data processing system 27 can receive and process sensor signals or sensor data from one or more row assemblies (15, or 115). For example, the offset guidance module 36, the centered guidance module 38, that data processor 28, or any combination of the foregoing can average, combine or statistically process sensor signals or sensor data from multiple row assemblies simultaneously during the same sampling interval as the vehicle traverses the field or work area. In particular, the offset guidance module 36, the centered guidance module 38, or both may determine a mean, mode, median or weighted average of the sensor signals or sensor data from multiple row assemblies.

Figure 4:
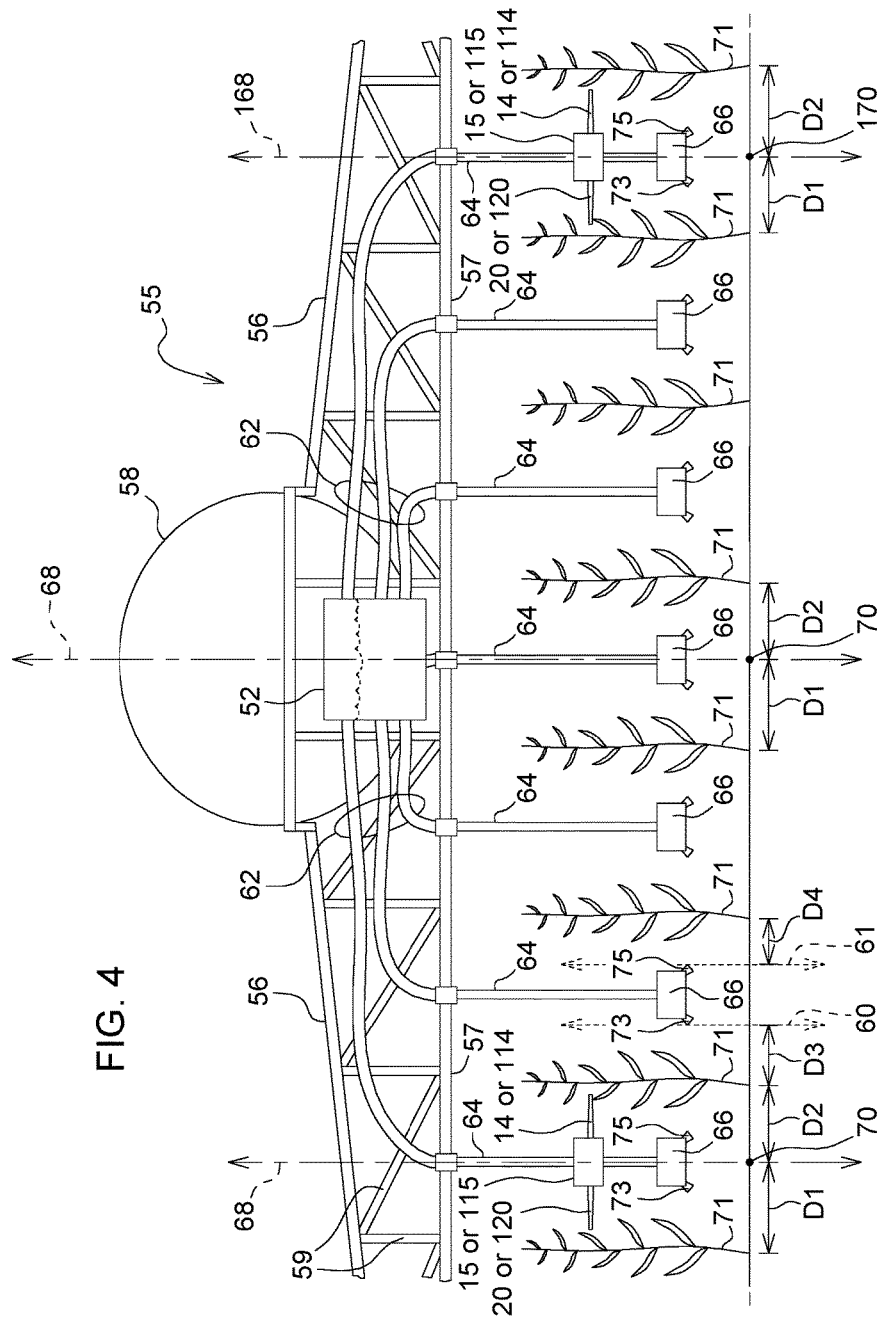
FIG. 4 illustrates a rear view of the sprayer of FIG. 3.

FIG. 4 illustrates a rear view of the sprayer of FIG. 3. FIG. 4 illustrates the sprayer boom 55 of FIG. 3 in greater detail. The sprayer boom 55 comprises a lower support 57 and an upper support 56, where the lower support 57 and the upper support 56 can be connected by a set of braces 59.

The sprayer boom 55 supports a set of row assemblies (15, 115), where first feeler unit (10, 110) has a first rotatable arm (14, 114) that can contact a first plant row, and where the second feeler unit (16, 116) has a rotatable arm (20, 120) that can contact a second plant row. Each row assembly (15, 115) may support or house a first feeler unit (10, 110) and a second feeler unit (16, 116). A tank 58 is centrally located and feeds the sprayer pump 52. The tank 58 holds crop inputs, such as chemicals, pesticide, insecticide, fertilizer, nutrients, fungicide, miticide, herbicide or other solutions. The sprayer pump 52 distributes the crop input from the tank 58 to tubes 62 or lines that are coupled to nozzles (73, 75) via the corresponding vertical support 64. Each row of plants 71 may be associated with one or more nozzles (73, 75).

As illustrated, each nozzle is supported by a generally vertical support 64 or pipe that extends downward from the boom 55 or sprayer implement toward the ground. The vertical support 64 or pipe terminates in a nozzle assembly 66, which may comprise a multiple nozzles (73, 75), such as a pair of nozzles facing or directed toward opposite rows of plants. Consistent with the spray control module 42, the sprayer controller 50 can switch on or off one or more nozzles (73, 75) of each nozzle assembly 66 or adjust the pressure at the nozzles (63, 75, 77), among other things.

FIG. 4 illustrates a first distance, D1, between a plant stem (or volumetric center) of plant 71 and a first axis 68 of the nozzle assembly 66, or primary axis 60 associated with lateral position of first nozzle 73. Similarly, FIG. 4 illustrates a second distance, D2, between the plant stem (or volumetric center) of the plant 71 and the first axis 68 of the nozzle assembly 66, or a secondary axis 61 associated with a lateral position of the second nozzle 75. When the vehicle 74 or implement operates in the centered mode or centered guidance mode, the first distance, D1, substantially equals the second distance, D2; the first axis 68 is generally aligned with a row center line 70 or a series of center points on the row center line 70. As illustrated in the FIG. 4, the row center line 70 of a leftmost row and a rightmost row are generally coincidental with the ground and are normal to the plane of the sheet of FIG. 4. Row assemblies (15, 115) and corresponding nozzle assemblies 66 are centered within the left most row, the center row and the rightmost row as illustrated in FIG. 4. In some cases all of the rows 71 are equally spaced and centered, whereas in other cases variations between rows can result from steering error or position error from adjacent passes or swaths (e.g., associated with guess rows) of a vehicle that planted the seeds or plants 71.

Alternately, FIG. 4 illustrates: (1) a primary distance, D3, that spans between a plant stem of plant 71 (or volumetric center) and primary axis 60 that intercepts or is coextensive with the primary lateral position of the first nozzle 73; (2) a secondary distance, D4, that spans between a plant stem (or volumetric center) of plant 71 and secondary axis 61 that intercepts or is coextensive with the secondary lateral position of the second nozzle 75. When the vehicle or implement operates in the centered mode or centered guidance mode, the primary distance, D3, substantially equals the secondary distance, D4; the first axis 68 is generally aligned with a row center line 70 or a series of center points on the row center line 70.

In contrast, when the vehicle or implement operates in the offset guidance mode, the first distance, D1, differs from the second distance, D2, and the first axis 68 and the second axis 168 are spaced laterally apart from a corresponding first row center line 70 and corresponding second row center line 170, respectively, by a lateral offset. Actually, the first distance, D1, can be regarded as first offset, whereas the second distance, D2, can be regarded as a second offset, where the first offset and the second offset are inversely proportional to each other. For example, as the first offset increase, the second offset decreases, and vice versa.

Figure 5:
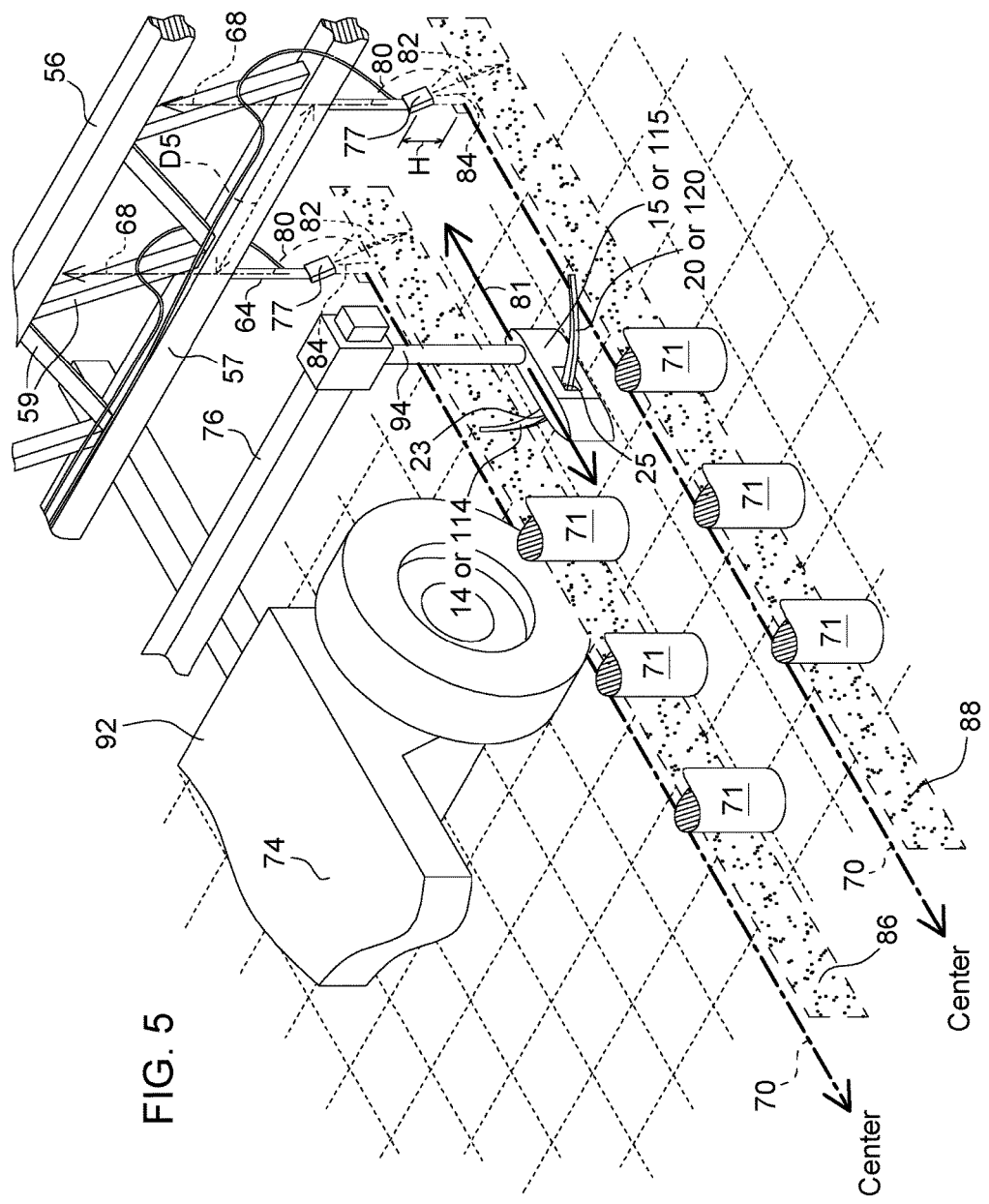
FIG. 5 illustrates a sprayer implement on a trailer that can be towed by a tractor or propulsion unit, where the sprayer implement can operate with a lateral offset with respect to a center line between adjacent crop rows to target one or more root zones of the crop rows with crop inputs.

FIG. 5 illustrates an alternate embodiment of a sprayer implement with a boom 55 mounted to a rear of a vehicle 74 or towed by a vehicle 74, where the sprayer implement can operate with an offset with respect to a row center line 70 between adjacent crop rows of plants 71 to target one or more root zones of the crop rows with crop inputs. FIG. 4 and FIG. 5 show similar alignment of the first axis 68 to each vertical support 64, where each vertical support 64 terminates in a directional nozzle 77. The boom 55 and the lower support member 57 are spaced apart (e.g., longitudinally) from the secondary support 76. Like reference numbers in FIG. 4 and FIG. 5 indicate like elements or features.

In FIG. 4, each row assembly (15, 115) is supported from lower support 57, whereas in FIG. 5, each row assembly (15, 115) is supported or suspended by secondary support member 76. The secondary support 76 is located in front of the lower support 57 toward the front of the vehicle 74, or longitudinally toward the direction of travel of the vehicle, such that the row assembly (15, 115) precedes the nozzle 77 as the sprayer vehicle traverses through the field during a spraying operation. In one configuration, the longitudinal offset between the secondary support 76 and the lower support 57 in the direction of travel allows for any processing delay to center or offset the nozzle 77 in the row. In one embodiment, each row assembly (15, 115) may have a lateral distance D5 from the first axis 68. A second axis 81 indicates the lateral position of the row assembly 81, which is parallel to or aligned with the direction of travel of the sprayer vehicle 74.

In an alternate embodiment, each row assembly (15, 115) is aligned laterally with the first axis 68, such that a longitudinal centerline or second axis 81 of the row assembly (15, 115) precedes the nozzle 77 with common lateral position. In other words, the nozzle 77 and centerline or second axis 81 of the row assembly (15, 115) have the same lateral position with respect to the boom 55 and the secondary support 76. Further, the row assembly (15 or 115) and its support 94 may come into contact with any object or obstruction in the field prior to the nozzle or boom 55 to protect the nozzle 77, the vertical support 64 and the boom 55 from damage from striking the obstruction or object.

FIG. 5 illustrates a directional spray pattern 84 from a directional nozzle 77 that is directed toward a target zone (86, 88) around one or more plant stems in a row. Like reference numbers in FIG. 3, FIG. 4 and FIG. 5 indicate like features or elements. As illustrated, the directional nozzle 77 has an angle 80 or compound angle with respect to the first axis 68 and a central nozzle axis 82. The first axis 68 may comprise a substantially vertical axis that is coextensive with the vertical support 64, whereas the central nozzle axis 82 defines a central direction of the directional spray pattern of the directional nozzle 77. The directional nozzle 77 has a height, H, above the ground. For example, the target zone (86, 88) may be associated with a root zone of the plants or the target zone (86, 88) may comprise a strip that intercepts or is bounded by a radius of the plant canopy, leaves or plant drip edge that are projected downward onto the soil or ground. The distance D5 shows the lateral separation between adjacent nozzles 77 and their respective vertical support 64 and corresponding first axes 68.

Figure 6:
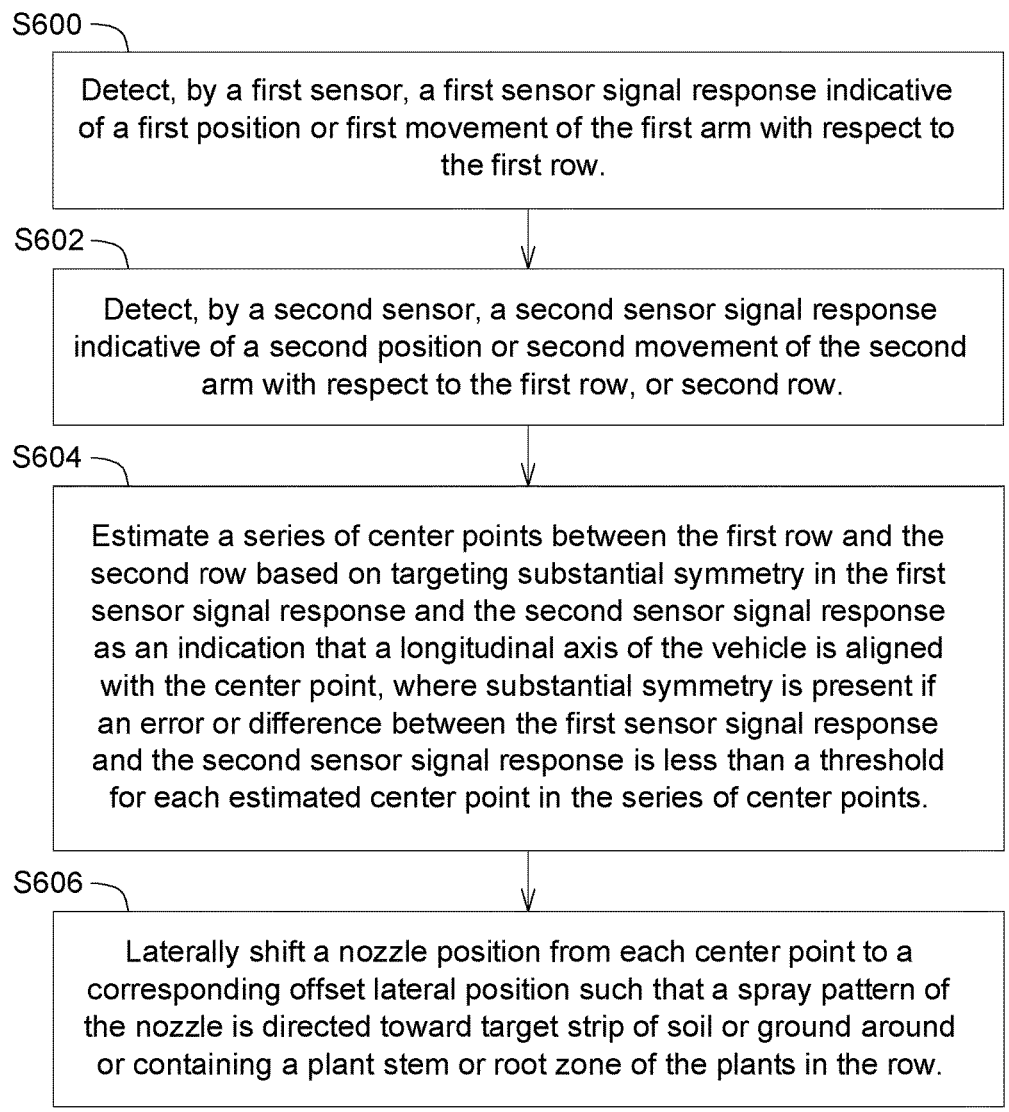
FIG. 6 is a flow chart of one embodiment of a method for guiding a vehicle with row feelers or tactile sensors for lateral offset application of crop inputs.

FIG. 6 is a flow chart of one embodiment of a method for guiding a vehicle with row feelers or tactile sensors for offset application of crop inputs. The method of FIG. 6 begins in step S600.

In step S600, a first sensor (12, 112) detects a first sensor signal response indicative of a first position or first movement of the first rotatable arm (14, 114) with respect to the first row. The first sensor signal response may comprise an observed sensor signal or digital data representative of an observed sensor signal during a sampling interval or sampling time period.

In step S602, a second sensor (18, 118) detects a second sensor signal response indicative of a second position or second movement of the second rotatable arm (20, 120) with respect to the first row, or second row. The second sensor signal response may comprise an observed sensor signal or digital data representative of an observed sensor signal during a sampling interval or sampling time period of the data processing system 26 or its sensors (12, 112, 18, 118).

In step S604, an electronic data processor 28, a centered guidance module 38 or a data processing system 26 estimates a series of center points of a row center line 70 between the first row and the second row based on targeting substantial symmetry in the first sensor signal response and the second sensor signal response as an indication that a longitudinal axis 88 of the vehicle is aligned with the center point or row center line 70. The row center line 70 is defined as an axis that intercepts two or more center points from different sampling intervals or sampling periods. The electronic data processor 28, the centered guidance module 38 or the data processing system 26 determines that substantial symmetry is present if an error or difference between amplitude or magnitude of the first sensor signal response and the second sensor signal response is less than a threshold for each estimated center point in the series of center point. Alternately, the electronic data processor 28, the centered guidance module 38 or the data processing system 26 determines that substantial symmetry is present if an error or difference between amplitude and phase (e.g., respective vectors) of the first sensor signal response and the second sensor signal response is less than a threshold for each estimated center point in the series of center point. For example, the centered guidance module 38, the offset guidance module 36, or the data processor 28 may convert digitized first sensor signal and the second sensor signal into a first vector and a second vector, respectively, where the first vector has a (mean) first phase and corresponding (mean) first magnitude and where the second vector has a (mean) second phase and corresponding (mean) second magnitude for each sampling interval or time period.

In step S606, a data processor 28, an offset guidance module 36 or a data processing system 26 laterally shifts a nozzle position from each center point of a row center point line 70 to a corresponding offset lateral position such that a spray pattern of the nozzle is directed toward target strip of soil or ground around or containing a plant stem or root zone of the plants in the row. For example, the data processing system 26, the offset guidance module 36, the data processing system 26, and the spray control module 42 can direct fertilizer in a directional spray pattern via a nozzle (73, 75, 77) having a set of one or more openings. In one configuration, the directional spray pattern is a substantially linear segment or substantially rectangular, where its longitudinal axis is aligned with or substantially parallel to the first row or the second row.

Figure 7:
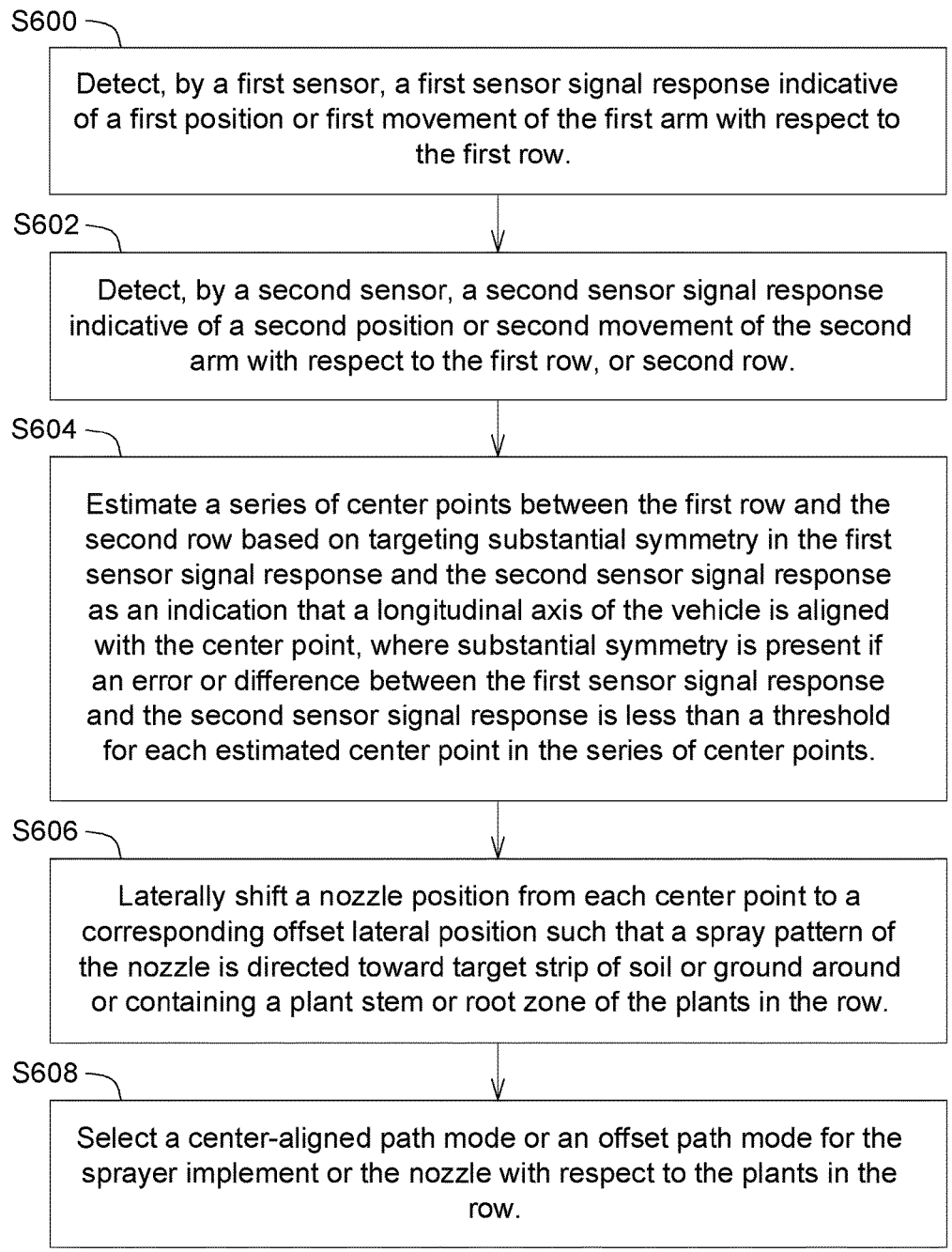
FIG. 7 is a flow chart of another embodiment of a method for guiding a vehicle with row feelers for lateral offset application of crop inputs.

The method of FIG. 7 is similar to the method of FIG. 6, except the method of FIG. 7 further comprises step S608. Like reference numbers in FIG. 6 and FIG. 7 indicate like steps, processes or features.

In step S608, a user interface 24 facilitates selection of a centered guidance mode on center-aligned path or an offset path mode on an offset-aligned path for the sprayer implement or the nozzle (73, 75, 77) with respect to the plants in the row.

Figure 8:
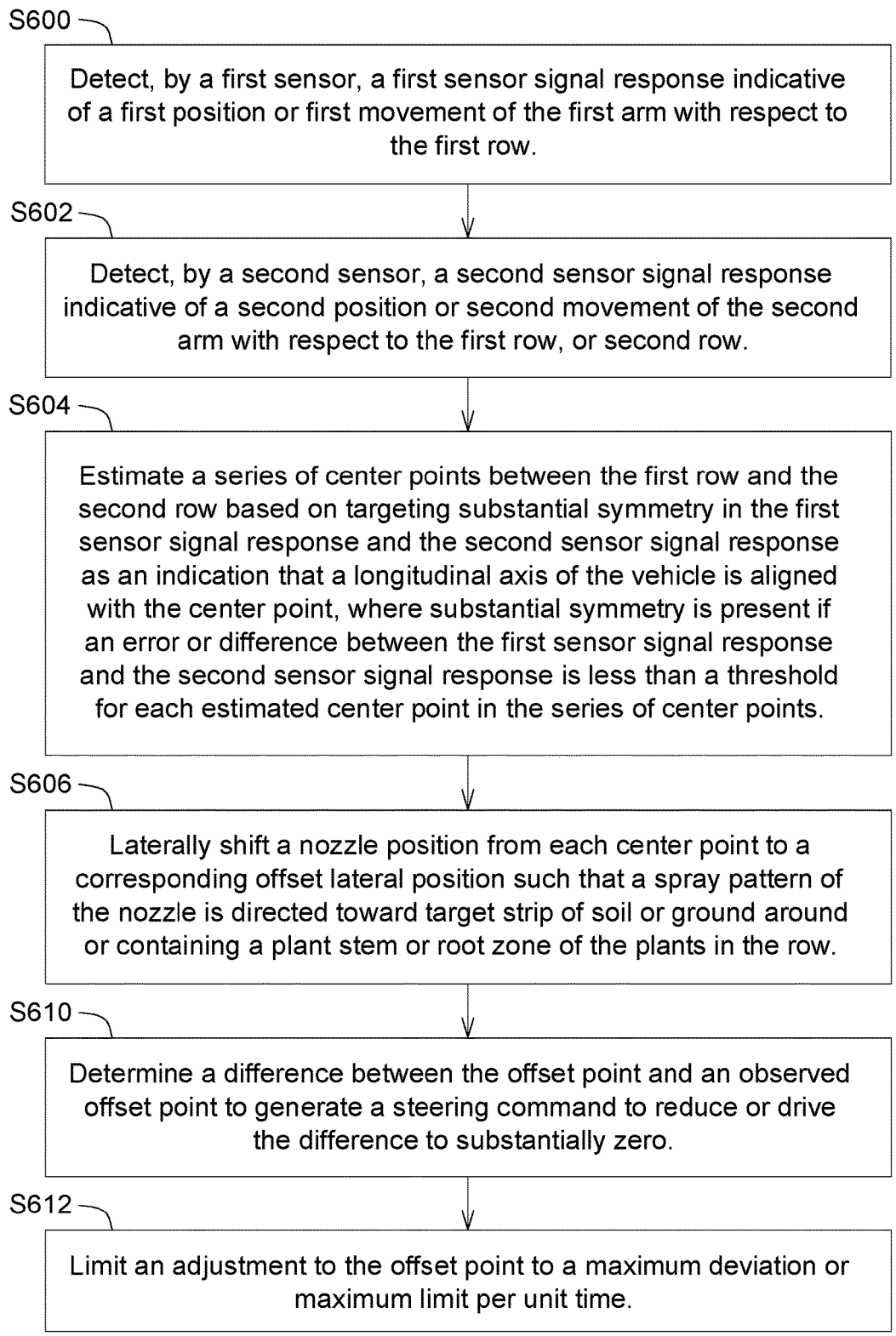
FIG. 8 is a flow chart of yet another embodiment of a method for guiding a vehicle with row feelers for lateral offset application of crop inputs.

The method of FIG. 8 is similar to the method of FIG. 6, except the method of FIG. 8 further comprises step S610 and S612. Like reference numbers in FIG. 6 and FIG. 8 indicate like steps, processes or features.

In step S610, the data processor 28, the offset guidance module 36, the data processing system 26, or the steering controller 44 determines a difference between the offset point and an observed offset point to generate a steering command to reduce or drive the difference to substantially zero.

In step S612, the data processor 28, the offset guidance module 36, the data processing system 26, or the steering controller 44 limits an adjustment to the offset point to a maximum deviation, a maximum limit per unit time, or to a lateral offset limit.

The mode selector 40 may automatically select between the offset guidance mode or the centered guidance mode for operating the nozzles (73, 75, 77) or implement between adjacent rows based on input data inputted via the user interface 24. Alternately, the user or operator may directly select the mode by entry of data or inputs into the user interface that is capable of communicating with the mode selector 40.

The mode selector 40 may select the operational mode in accordance with techniques, which may be applied separately or cumulatively. Under a first technique, the mode selector 40 selects or the user interface 24 facilitates selection of a center-aligned path mode with a center-aligned path of the implement or nozzle if the sprayer implement is arranged or ready to spray pesticide, insecticide, or fungicide. Under a second technique, the mode selector 40 selects or the user interface 24 facilitates selection of a center-aligned path mode with a center-aligned path of the nozzle or the sprayer implement if the nozzle or active nozzle has a substantially conical spray pattern, a fan spray pattern or a substantially linear spray pattern. Under a third technique, the mode selector 40 selects or the user interface facilitates selection of an offset-aligned path mode of the nozzle or the sprayer implement if the nozzle comprises a fertilizer nozzle with one to three spray openings for the fertilizer to be dispensed.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The following is claimed:

1. A system for guiding a vehicle, the system comprising:
   a first arm for pivoting about a first pivot point associated with a sprayer implement in response to contact with a first row of plants;
   a first sensor associated with the first arm to provide a first sensor signal response indicative of a first position or first movement of the first arm with respect to the first row;
   a second arm for pivoting about a second pivot point associated with a sprayer implement, in response to contact with the first row, or second row of plants spaced apart from the first row with a substantially parallel spacing;
   a second sensor associated with the second arm to provide a second sensor signal response indicative of a second position or second movement of the second arm with respect to the first row, or second row;
   a data processor for estimating a series of center points between the first row and the second row based on targeting substantial symmetry in the first sensor signal response and the second sensor signal response as an indication that a longitudinal axis of the vehicle is aligned with the center point, where substantial symmetry is present if an error or difference between the first sensor signal response and the second sensor signal response is less than a threshold for each estimated center point in the series of center points;
   a nozzle associated with the sprayer implement, the nozzle having a nozzle position with respect to a corresponding center point between the rows of plants;
   an offset module to laterally shift a nozzle position from each center point to a corresponding lateral position of an offset point such that a spray pattern of the nozzle is directed toward target strip of soil or ground around or containing a plant stem of the plants in the row; and
   a tracking module to determine a difference between the offset point and an observed offset point to generate a steering command to reduce or drive the difference to substantially zero, wherein the offset module and the tracking module comprise logic, software or a set of instructions for the data processor to process, wherein the offset module and the tracking module are stored on a data storage device.

2. The system according to claim 1 wherein a supply tube feeds the nozzle, the supply tube extending vertically downward from the sprayer implement, the supply tube terminating in the nozzle, the nozzle having a set of one or more openings for directing fertilizer in a directional spray pattern.

3. The system according to claim 1 wherein the directional spray pattern is a substantially linear segment or substantially rectangular, where its longitudinal axis is aligned with or substantially parallel to the first row or the second row.

4. The system according to claim 1 further comprising:
   a mode selector for selecting a center-aligned path mode or an offset path mode for the sprayer implement or the nozzle with respect to the plants in the row, the mode selector selecting the offset path mode in response to a user input into a user interface.

5. The system according to claim 1 further comprising:
a mode selector for selecting a center-aligned path mode with a center-aligned path of the implement or nozzle if the sprayer implement is arranged or ready to spray pesticide, insecticide, or fungicide.

6. The system according to claim 1 further comprising:
a mode selector for selecting a center-aligned path mode with a center-aligned path of the nozzle or the sprayer implement if the nozzle or active nozzle has a substantially conical spray pattern, a fan spray pattern or a substantially linear spray pattern.

7. The system according to claim 1 further comprising:
a mode selector to select an offset-aligned path mode of the nozzle or the sprayer implement if the nozzle comprises a fertilizer nozzle with one to three spray openings for the fertilizer to be dispensed.

8. The system according to claim 1 further comprising:
an offset point limit module to limit an adjustment to the offset point to a maximum deviation or maximum limit per unit time.

9. A method for guiding a vehicle, the method comprising:
detecting, by a first sensor, a first sensor signal response indicative of a first position or first movement of the first arm with respect to the first row;
detecting, by a second sensor, a second sensor signal response indicative of a second position or second movement of the second arm with respect to the first row, or second row;
estimating a series of center points between the first row and the second row based on targeting substantial symmetry in the first sensor signal response and the second sensor signal response as an indication that a longitudinal axis of the vehicle is aligned with the center point, where substantial symmetry is present if an error or difference between the first sensor signal response and the second sensor signal response is less than a threshold for each estimated center point in the series of center points;
laterally shifting a nozzle position from each center point to a corresponding lateral position of an offset point such that a spray pattern of the nozzle is directed toward target strip of soil or ground around or containing a plant stem, or root zone, of the plants in the row; and
determining a difference between the offset point and an observed offset point to generate a steering command to reduce or drive the difference to substantially zero.

10. The method according to claim 9 further comprising:
directing fertilizer in a directional spray pattern via a nozzle having a set of one or more openings.

11. The method according to claim 10 wherein the directional spray pattern is a substantially linear segment or substantially rectangular, where its longitudinal axis is aligned with or substantially parallel to the first row or the second row.

12. The method according to claim 9 further comprising:
selecting, by a user interface, a center-aligned path mode or an offset path mode for the sprayer implement or the nozzle with respect to the plants in the row.

13. The method according to claim 9 further comprising:
selecting a center-aligned path mode with a center-aligned path of the implement or nozzle if the sprayer implement is arranged or ready to spray pesticide, insecticide, or fungicide.

14. The method according to claim 9 further comprising:
selecting a center-aligned path mode with a center-aligned path of the nozzle or the sprayer implement if the nozzle or active nozzle has a substantially conical spray pattern, a fan spray pattern or a substantially linear spray pattern.

15. The method according to claim 9 further comprising:
selecting an offset-aligned path mode of the nozzle or the sprayer implement if the nozzle comprises a fertilizer nozzle with one to three spray openings for the fertilizer to be dispensed.

16. The method according to claim 9 further comprising:
limiting an adjustment to the offset point to a maximum deviation or maximum limit per unit time.

* * * * *